W. C. BERRY.
Vegetable Cutter.

No. 31,005. Patented Jan. 1, 1861.

Witnesses

Inventor
Wm. C. Berry

UNITED STATES PATENT OFFICE.

WILLIAM C. BERRY, OF WOODBRIDGE, NEW JERSEY.

MACHINE FOR CUTTING ROOTS.

Specification of Letters Patent No. 31,005, dated January 1, 1861.

*To all whom it may concern:*

Be it known that I, WILLIAM C. BERRY, of Woodbridge, in the county of Middlesex and State of New Jersey, have invented a new and Improved Machine for Cutting Roots, called "The Horizontal Root-Cutter;" and I do hereby declare that the following is a full, clear, and exact description of the construction and operation of the same, reference being had to the annexed drawings, making a part of this specification, in which—

Figure 1:
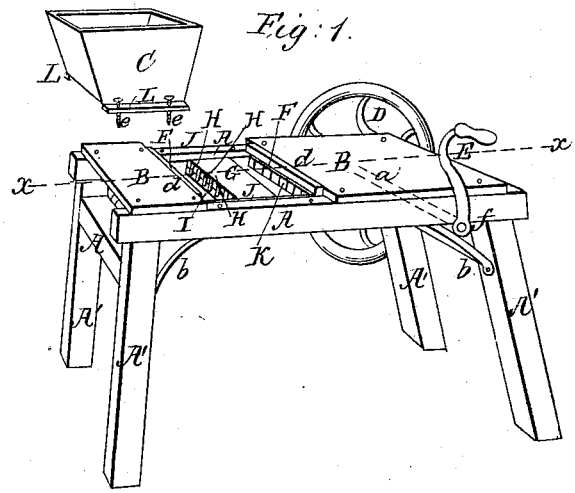
Figure 2:
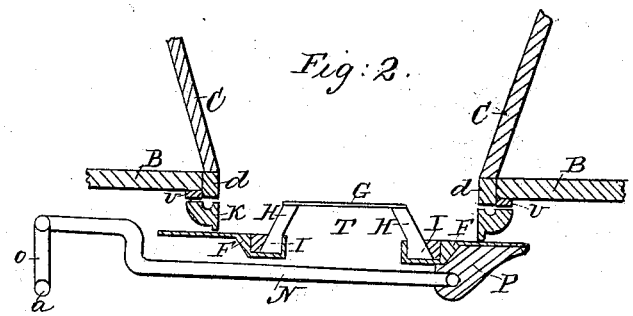
Figure 3:
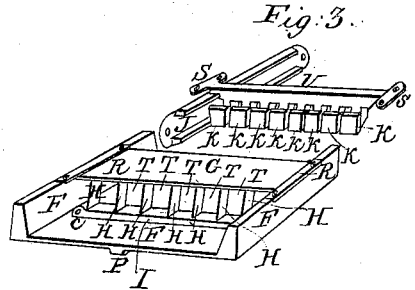

Figure 1, is a perspective view of my invention with the hopper removed; Fig. 2, is a side sectional view of the same, taken in the line $x, x$, Fig. 1; Fig. 3, is a perspective view of the cutter, guide-box and finger plates.

Similar letters of reference indicate corresponding parts in the several figures.

This invention relates to an improved device for cutting roots.

The invention is designed for preparing roots as food for horses, cattle, sheep, &c., and the improvement is intended to prevent the clogging or wedging of the pieces of roots between the knives, and also to render the process less laborious and more expeditious.

To enable those skilled in the art to fully understand and construct my invention, I will proceed to describe it.

A, A, represent a rectangular frame supported by legs A′, A′. On the top of this are fastened the boards B, B. On one end are the fly-wheel D and the crank E, connected with each other by the shaft or axle indicated by the dotted line $a$. This shaft is attached to the under side of the frame A, A by boxes $f$.

$b, b$ are iron braces to strengthen the frame A, A.

F is the cutter which slides in the guide boxes J, J, attached to the inside of the frame A, A.

G is a large, horizontal, two-edged knife, fastened, by plates R, R, Fig. 3, to the upper part of the sides, and over an opening, T, in the bottom, of the cutter F, which opening is of the same size as the knife G, as shown in Fig. 2.

The cutter, F, consists of two sides, which slide in the guide boxes J, J, and a bottom in two parts, fast to the under part of the sides, commencing on a line with the knife G, on each side of it and an inch below it, or, as far as it is desirable to have the size of the roots when cut. The width of each part of the bottom is a little more than the width of the knife G. The edges of the bottom of the cutter F, nearest to the knife G, are thicker than the rest of the bottom, and contain cavities for the small, upright knives, H, H, which extend from the bottom of the cutter F to the under side of the knife G. There are two sets of small knives H, H, one set on each side of the knife G. They have their lower ends dove-tailed, and are fastened to their places in the bottom of the cutter, F, by the oblong wedges I, I, as shown in Fig. 2. These wedges are secured, in slots in the bottom of the cutter F, by screws $c, c$, Fig. 3. The knives H, H, may be as far apart as it is desirable to have the size of the roots when cut.

K, K, are finger plates, fastened to the frame A, A, by flanges S, S, on the bar U, Fig. 3. There are two sets of finger plates one on each side of the knife G, and their distance apart is twice the width of this knife.

$d, d$, are strips of wood, fastened to the boards B, B, in such a manner as to leave an opening between them and the finger plates K, K, large enough for the knife G to pass in, and out of, freely, Figs. 1 and 2.

C, is the hopper or root-box, which is fastened, over the cutter, to the frame A, A, by screws $e, e$, in the flanges L, L.

N, Fig. 2, is a rod, connecting the cutter F, by flange P, to shaft $a$, by crank O. This crank has a stroke the same length as the width of the knife G.

The small knives H, H, are so made and fastened to the cutter F, that the edges of upper ends of them are even with the edge of the horizontal knife G, and the back parts of the lower ends are on a line perpendicular to the edge of knife G.

The shaft, $a$, may be provided with either one or two cranks, O, as may be desired. If one, the connection with the cutter F, may be by a single rod, as N, or, by a forked rod, diverging from the crank, O, to flanges on each side of the cutter F, on a line with the flange P, which may then be dispensed with. If two cranks are used, two rods, attached to the cutter F, in the same way as the forked rod, will be necessary.

The operation is as follows: As the crank E, is turned, the crank O, of the axle $a$, in connection with the rod N, gives a reciprocating movement to the cutter F, and the knives G, and H, H, pass through the roots which rest on the bottom of the cutter F, and are held by the finger plates K, K, and the strips $d, d$. Those parts of the roots below the knife G, being detached from the parts above it are shoved by the finger-plates K, K, into the opening T and fall into any receptacle which may be placed for them. The knives H, H, pass in and out between the finger plates K, K, and the knife G, passes in and out between the finger plates K, K, and the strips $d, d$.

The knife G, operates quite differently from all the knives which I have seen. Its edges being coincident with the edges of the opening, T, beneath it, it is impossible for the roots to wedge. The small knives H, H, are narrow and are so placed that but half of their length acts directly on the roots and the chances of wedging are reduced to almost nothing. The wedges I, I, used in connection with the knives H, H, differ entirely from any method of fastening knives that I have seen.

Having thus described my invention, what I claim as new and desire to secure by Letters Patent, is—

The knives G, and H, H, and the wedges I, I, arranged relatively with the cutter F, and the finger plates K, K, to operate as and for the purpose set forth.

WILLIAM C. BERRY.

Witnesses:
    A. R. HAIGHT,
    R. T. CAMPBELL.